H. M. ROCKWELL.
METHOD OF INSERTING BALLS BETWEEN RACE MEMBERS.
APPLICATION FILED MAY 1, 1920.
1,419,521. Patented June 13, 1922.
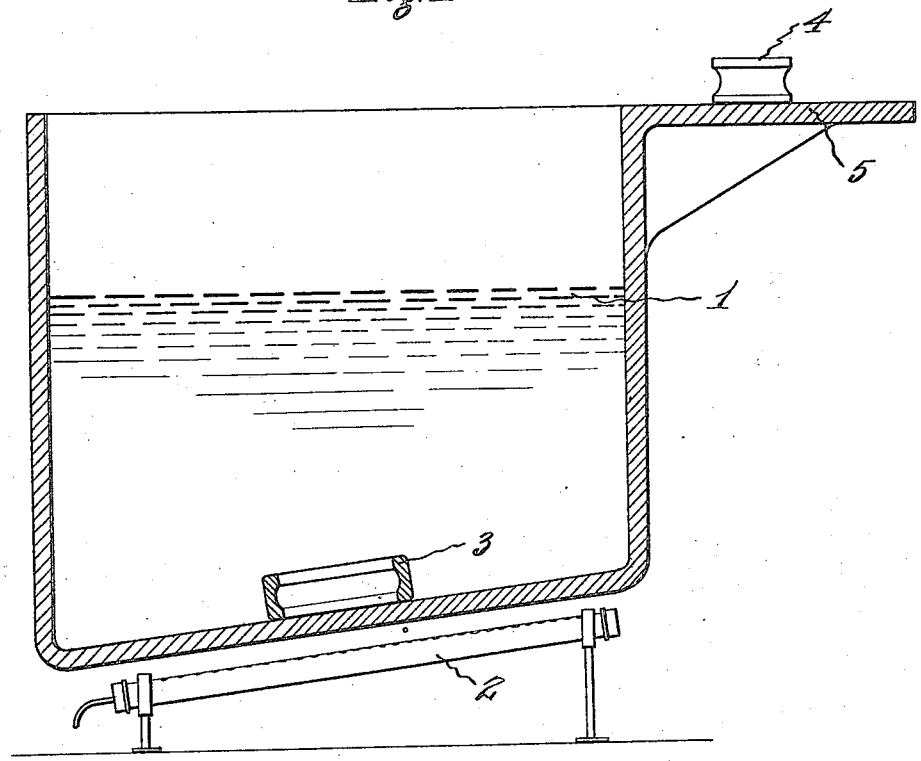
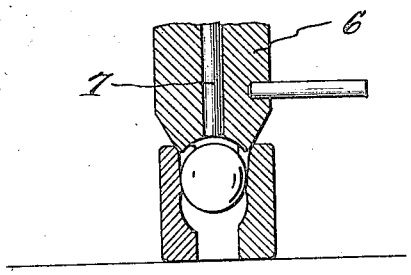
INVENTOR
HUGH M. ROCKWELL.
BY
Edward C. Sassett.
ATTORNEY

UNITED STATES PATENT OFFICE.

HUGH M. ROCKWELL, OF BRISTOL, CONNECTICUT, ASSIGNOR, BY MESNE ASSIGNMENTS, TO STANDARD STEEL AND BEARINGS INCORPORATED, OF WILMINGTON, DELAWARE, A CORPORATION OF DELAWARE.

METHOD OF INSERTING BALLS BETWEEN RACE MEMBERS.

1,419,521.  Specification of Letters Patent.  Patented June 13, 1922.

Application filed May 1, 1920. Serial No. 378,309.

*To all whom it may concern:*

Be it known that I, HUGH M. ROCKWELL, a citizen of the United States, and a resident of Bristol, in the county of Hartford and State of Connecticut, have invented certain new and useful Improvements in Methods of Inserting Balls Between Race Members, of which the following is a specification.

This invention relates to antifriction bearings and more especially to a method of assembling ball bearings of the self-contained or unit-handling type.

In ball bearings of this type either the inner or outer race member or both are provided with a groove extending from the face of the race member to the raceway for the purpose of supplying a filling opening through which a portion of the balls may be inserted. The groove or grooves are so arranged as not to interrupt the ball tracks. Instead there is left at the inner end of the groove or grooves a slight shoulder or shoulders past which the ball has to be snapped and which serves to prevent the escape of a ball from the raceways. These shoulders are necessarily very slight in order that the ball be not distorted or injured when snapped into the raceways. For example, in a single-row bearing having a groove in each race member each shoulder is from two to four thousandths of an inch. For many reasons it is desirable that the shoulder at the inner end of the groove be higher than has heretofore been possible.

I have devised a method of introducing balls into the raceways, the practice of which allows such shoulders to be materially increased. Bearings assembled according to this method may have the grooves so cut that the vertical distance between the ball track of the raceway and the end of the groove is from twenty-five to thirty-five thousandths of an inch.

In the improved method of introducing balls between the raceways, advantage is taken of the expansion of metal when heated and of the resiliency of the race members. Before attempting to insert the balls between the raceways of two race members, the outer race member is heated to as high a temperature as possible without injuring its temper, the inner race member being retained at normal temperature or artificially cooled, as desired. Then by eccentric axial displacement or other method most of the balls are introduced between the race members. With the two race members in assembled relation a ball is placed in the outer end of the filling opening ready to be inserted between the ball tracks. Pressure is then applied to each race member to force farther apart the portions of the race members adjacent the ball, such pressure preferably being applied by means of a wedge, the nose of which is shaped to fit into the filling opening. The resiliency of the tempered race members allows the portions against which the pressure is applied to yield sufficiently to snap in the ball and to return to normal position after the pressure is relieved.

The invention is illustrated diagrammatically in the accompanying drawings wherein—

Fig. 1 is a view of the heating means;

Fig. 2 is a view of the pressure-applying means.

A bath of oil 1 is maintained at a temperature of from 300° to 350° F. by means of any suitable source of heat 2. The outer race member 3 is immersed in the bath 1 and is kept there until it has attained the temperature of the oil, the inner race member 4 being left on the shelf 5 and kept at room temperature or lower if desired. After the outer race member is sufficiently heated it is removed from the bath and as many balls inserted between the race members as can be gotten in without pressure, this being accomplished according to methods well known in the art. With the race members arranged in assembled relation, a ball is dropped into the filling opening and a pressure tool 6 having a tapering nose shaped to fit into the filling opening, said nose having a recess to receive the ball, is brought into contact with the race members. The tool 6 is forced into the filling opening, thus exerting pressure on the race members to enlarge the radial distance between opposed portions thereof. A spring-pressed plunger 7 or other suitable means forces the ball through the filling opening when the race members have been sufficiently separated.

Using this method of assembly the height of the shoulder or shoulders left on one or both race members between the ball track and the end of the filling opening can be increased approximately tenfold. Thus all danger of escape of a ball from the race members is prevented and there is obtained a larger effective groove for the balls to travel in.

It is, of course, understood that while the drawings disclose the method as practiced in connection with single-row bearings, the method is equally well applicable to double-row bearings.

What I claim is:

1. The method of inserting balls between the raceways of antifriction bearings which consists in heating the outer race member to a temperature materially in excess of that of the inner race member, applying pressure to opposed portions of the race members in directions to spread said members apart, and simultaneously forcing a ball between the race members adjacent the points of application of said pressure.

2. The method of assembling unit-handling ball bearings in which the inner and outer race members are integral structures in one or both of which there is a filling opening extending short of the ball track, said method consisting in heating the outer race member to a relatively high temperature with respect to the inner race member, then bringing the two race members into concentric position, applying pressure to opposed portions of the race members in directions to spread said members apart adjacent the filling opening, and simultaneously applying pressure to a ball to force the same through the filling opening whereby the remainder of the balls are inserted between the two race members.

3. The method of inserting balls between the race rings of an antifriction bearing which consists in heating the outer race ring to expand the same and thereby widen the gap between the outer and the inner rings, and in forcing a ball through the widened gap into operative position between the rings.

HUGH M. ROCKWELL.